United States Patent
Parihar et al.

(10) Patent No.: US 11,202,292 B1
(45) Date of Patent: Dec. 14, 2021

(54) SYSTEMS AND METHODS FOR DYNAMIC BUFFER MODIFICATION

(71) Applicant: Sprint Spectrum LP, Overland Park, KS (US)

(72) Inventors: Vanil Parihar, Overland Park, KS (US); Sreekar Marupaduga, Overland Park, KS (US); Rajveen Narendran, Olathe, KS (US); Rashmi Kumar, Herndon, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 31 days.

(21) Appl. No.: 16/774,459

(22) Filed: Jan. 28, 2020

(51) Int. Cl.
- *H04W 72/04* (2009.01)
- *H04L 5/00* (2006.01)
- *H04W 28/02* (2009.01)
- *H04W 24/08* (2009.01)

(52) U.S. Cl.
CPC ....... *H04W 72/0486* (2013.01); *H04L 5/0032* (2013.01); *H04W 24/08* (2013.01); *H04W 28/0215* (2013.01)

(58) Field of Classification Search
None
See application file for complete search history.

(56) References Cited

U.S. PATENT DOCUMENTS

| | | | |
|---|---|---|---|
| 9,955,506 B2 | 4/2018 | Rahman et al. | |
| 2013/0188482 A1* | 7/2013 | Lee | H04L 47/25 370/235 |
| 2013/0188580 A1* | 7/2013 | Dinan | H04W 74/085 370/329 |
| 2014/0079016 A1 | 3/2014 | Dai et al. | |
| 2015/0078261 A1* | 3/2015 | Yu | H04W 28/0236 370/329 |
| 2017/0034706 A1* | 2/2017 | Ericson | H04W 72/1215 |
| 2018/0027495 A1* | 1/2018 | Song | G06F 1/3206 455/343.2 |
| 2018/0270170 A1* | 9/2018 | Shetti | H04W 80/06 |
| 2021/0092690 A1* | 3/2021 | Bergstrom | H04W 52/367 |

* cited by examiner

Primary Examiner — Jay L Vogel

(57) ABSTRACT

A system for dynamically modifying a buffer in a network deploying multiple carriers is provided. Each carrier operating over the network utilizes a radio access technology (RAT). The system includes a network load monitoring processor that measures a network load on carriers using a first RAT to produce a measured value and a buffer management processor that receives the measured value, performs a comparison of the measured value with a predetermined value, and dynamically modifies a size of the buffer when the measured value exceeds the predetermined value.

19 Claims, 6 Drawing Sheets

SYSTEMS AND METHODS FOR DYNAMIC BUFFER MODIFICATION

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Deployment of the evolving RATs in a network provides numerous benefits. For example, newer RATs may provide additional resources to subscribers, greater network coverage, faster communications speeds, and other advantages.

Deployment of evolving RATS also creates numerous challenges for network operators. Because multiple RATs are in use over the network simultaneously, and the newer technologies are deployed over time, newer RAT technologies can over-load the network and result in slower service or service interruptions. Further, network resources devoted to pre-existing RAT technologies may be under-utilized, thereby resulting in a waste of network resources and capacity. Therefore, there is a need for systems and methods that can improve overall resource utilization of different RATs within a wireless network.

OVERVIEW

Exemplary embodiments described herein include systems, methods, and processing nodes for modifying a buffer based on detected network conditions. An exemplary system is described herein for dynamically modifying a buffer in a network deploying multiple carriers, each carrier utilizing a radio access technology (RAT). The system includes a network load monitoring processor that measures a network load on carriers using a first RAT to produce a measured value. The system additionally includes a buffer management processor that receives the measured value, performs a comparison of the measured value with a predetermined value, and dynamically modifies a size of the buffer when the measured value exceeds the predetermined value.

An exemplary method is described herein for dynamically modifying a buffer in a network deploying multiple carriers, each carrier utilizing a radio access technology (RAT). The method includes setting a trigger to a predetermined value for a network load for carriers utilizing a first RAT in the network and monitoring the network to determine a measured value of the network load for carriers utilizing the first RAT. The method additionally includes performing a comparison to determine when the measured value exceeds the predetermined value. When the measured value exceeds the predetermined value, the method activates the trigger and modifies a size of the buffer in response to activation of the trigger.

An exemplary processing node described herein for dynamic buffer modification is configured to perform various operations. The processing node operates in a network deploying multiple carriers, each carrier utilizing a radio access technology (RAT). The processing node includes a network traffic monitoring processor that measures a first network load for carriers using a first RAT and a second network load for carriers using a second RAT. The processing node additionally includes a buffer management processor that receives a measured value of the first network load and performs a comparison of the measured value with a predetermined value. When the measured value exceeds the predetermined value, the buffer management processor compares the second network load with a max load, and if the second network load is less than the max load, the buffer management processor dynamically reduces a size of a buffer associated with the first RAT, thereby initiating carrier aggregation.

DETAILED DESCRIPTION

Figure 1:
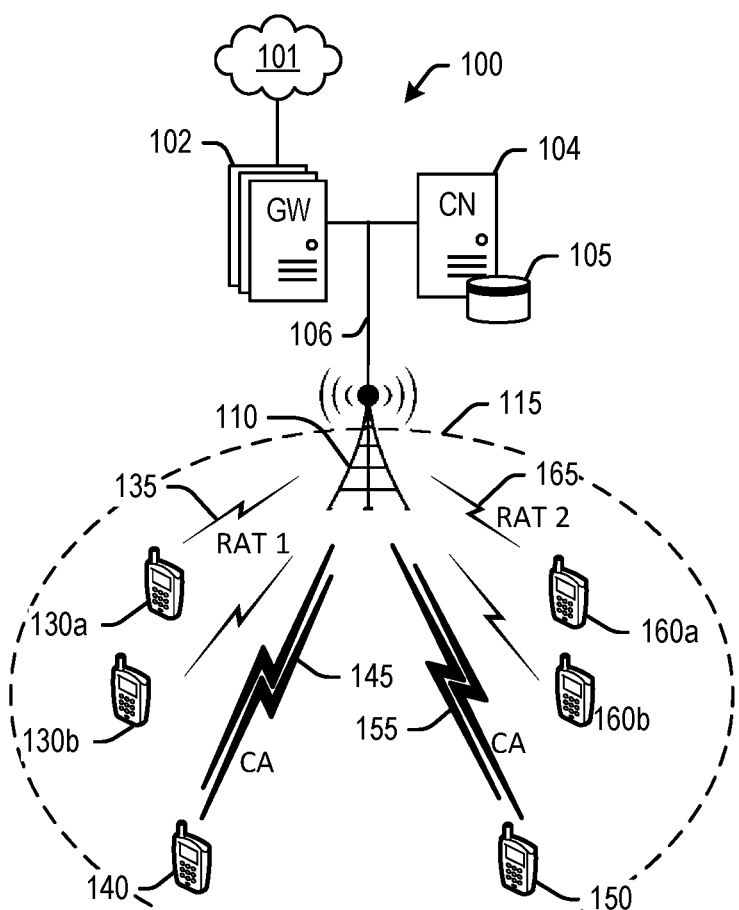
FIG. 1 depicts an exemplary system for wireless communication, in accordance with the disclosed embodiments.

Exemplary embodiments described herein include systems, methods, and processing nodes for dynamic buffer modification. The disclosed systems and methods may be implemented in any wireless network in which two or more RATs are utilized by network carriers.

For example, a cell or wireless network may be provided by an access node. The access node may communicate with wireless devices or UEs using two or more RATs. The wireless devices and access node may be configured to support multiple RATs. One or more network buffers may be associated with each RAT. If a network buffer for a first RAT is full or exceeds a predetermined value, wireless devices may be forced to utilize an additional or alternative carrier employing a different RAT for signal or data transmission.

The use of multiple carriers by one wireless device, or carrier aggregation (CA), enables multiple carriers to increase the bandwidth available to the UE. When carriers are aggregated, each carrier may be referred to as a component carrier. Of the component carriers, one may be a primary carrier (PCell) and one or more other carriers may be secondary carriers (SCells). In embodiments disclosed herein, One RAT may be associated with PCells and one or more additional RATs may be associated with an SCells for the purposes of CA. Thus, reduction in the size of a buffer associated with the PCell can be triggered in order to cause one or more wireless devices to utilize the SCells, in order to utilize CA and maintain a balanced network load. The particular use of the PCell and SCells can vary. For example, all uplink transmissions may be performed by the PCell and all downlink transmissions may be performed by the SCell. Alternatively, the PCell and SCell may be determined based on transmission channels. Downlink transmission channels include a physical downlink control channel (PDCCH) and a physical downlink shared channel (PDSCH) and uplink control channels including a physical uplink control channel (PUCCH) and a physical uplink shared channel (PUSCH) may be designated for use by the PCell or SCell.

The present disclosure provides dynamic buffer modification based on network load conditions in order to maintain a balanced network load and avoid interference and reductions in service quality. The dynamic buffer modification may be triggered based on loading conditions on a particular RAT. In some embodiments, the dynamic buffer modification may be triggered based on loading conditions on two different RATs, such as, for example, new radio (NR) and long term evolution (LTE) RATS. Embodiments may utilize and ENDC architecture, which allows devices to access both LTE and 5G simultaneously on the same spectrum band. Through this technology, wireless devices receive the benefit of capacity from both an LTE network as well as a 5G network.

In some embodiments, loading conditions are determined by monitoring a number of devices using each RAT. In other embodiments, loading conditions are determined by monitoring physical resource block (PRB) usage. One or more PRBs may be allocated to a wireless device in order to transmit or receive data on each of the above-mentioned channels. If loading conditions associated with one RAT exceed a predetermined value, embodiments of the system reduce a buffer size for that RAT. In some embodiments, the system monitors loading conditions related to two different RATs prior to triggering buffer modification.

Conventional systems trigger CA based on the needs of wireless devices. For example, CA may be triggered when data stored in a buffer of the wireless device meets a buffer occupancy limit. However, this CA scheme does not operate to balance the resources of the network as a whole. The present disclosure enables CA to be dynamically triggered by modifying a buffer size based on network loading conditions, which may be determined in real time. This results in an improvement to the overall performance of the network and service to the individual wireless devices.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a gigabit NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for dynamic buffer modification may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system for wireless communication. System 100 may be a wireless communication network, such as a cellular network. System 100 may include a communication network 101, a gateway 102, a controller node 104, and one or more access nodes 110. One or more end-user wireless devices may be directly connected to access node 110, such as end-user wireless devices 130a, 130b, 140, 150, 160a, and 160b.

In this exemplary embodiment, access node 110 may be a macrocell access node configured to deploy at least two different carriers, each of which utilizes a different RAT. For example, a first carrier may be deployed by access node 110 in an LTE mode, and a second carrier may be deployed by access node 110 in an NR mode. Thus, in an embodiment, access node 110 may comprise two co-located cells, or antenna/transceiver combinations that are mounted on the same structure. In some embodiments, multiple access nodes 110 may be deployed and each access node 110 may support a different RAT. For example, a gNodeB may support NR and an eNodeB may provide LTE coverage. The carriers may further utilize different frequency bands or sub-bands and additionally may be deployed using different types of multiplexing modes. In other embodiments, any other combination of access nodes and carriers deployed therefrom may be evident to those having ordinary skill in the art in light of this disclosure.

Wireless devices 130a, 130b, 140, 150, 160a, and 160b are illustrated as being in communication with access node 110 over various types of communication links. Each of the end-user wireless devices 130a, 130b, 140, 150, 160a, and 160b may be attached to the wireless air interface deployed by access node 110. Wireless links 135 and 165, as well as other wireless links that directly couple end-user wireless devices 140a, 140b, 140c, and 140d with access node 110, as shown in FIG. 1, form the wireless network (or wireless radio air interface) deployed by access node 110 within coverage area 115.

In disclosed embodiments, wireless devices 130a and 130b are illustrated as being in communication with access node 110 using a first RAT, which may provide, for example an NR communications link 135. The NR communication link 135 may comprise any communication channel that utilizes air-interface resources of an NR carrier deployed by access node 110. Wireless devices 160a and 160b may be in communication with the access node 110 over a second RAT, which may be for example, an LTE communications link 165 provided by any LTE carrier connected to the access node 110. Further, wireless devices 140 and 150 are illustrated as being in communication with access node 110 over communication links 145 and 155 respectively. The communication links 145 and 155 utilize a carrier aggregation operating mode, i.e. they utilize wireless air interface resources from more than one carrier. For example, communication link 145 may utilize air-interface resources of at least one carrier utilizing the first RAT and at least another carrier, including any alternative carrier that in accordance with embodiments disclosed herein is using a second RAT and is connected with the access node 110. In embodiments an NR carrier is utilized as a primary carrier and at least on LTE carrier is utilized as a secondary carrier. Other configurations are within scope of the disclosure.

Further, different network buffers may be associated with each type of RAT. The network buffers may be included in the access node 110, gateway node 102, controller node 104, database 105 or other location. In conventional implementations, network buffer sizes are fixed. However, in embodiments disclosed herein, the access node 110, a processing node communicatively coupled to access node 110, or any other node within system 100, may be configured to dynamically modify buffer sizes to provide a better overall throughput experience for wireless device users. Modification of the buffer size, for example for an NR buffer, can be configured to provide a superior throughput experience during NR loading conditions. Upon dynamic modification of the buffer size, one or more wireless devices may be instructed to operate in carrier aggregation mode, i.e. to utilize resources from both a primary carrier using one RAT and at least one secondary carrier using another RAT.

Access node 110 can be any network node configured to provide communication between wireless devices 130a, 130b, 140, 150, 160a, and 160b and communication network 101, including standard access nodes such as a macro-cell access node, base transceiver station, a radio base station, an eNodeB device, an enhanced eNodeB device, a gNodeB device or the like. In an exemplary embodiment, a macro-cell access node can have a coverage area 115 in the range of approximately five kilometers to thirty-five kilometers and an output power in the tens of watts. Alternatively, access node 110 may comprise a short range, low power, small-cell access node such as a microcell access node, a picocell access node, a femtocell access node, or a home eNodeB device.

Access node 110 may be any network node configured to provide communication between end-user wireless devices 130a, 130b, 140, 150, 160a, and 160b and communication network 101, including standard access nodes such as a macro-cell access node, a base transceiver station, a radio base station, an eNodeB device, an enhanced eNodeB device, a gigabit NodeB (or gNodeB) in 5G New Radio ("5G NR"), or the like. For example, access node 110 may implement 5G NR technologies to deploy a wireless network that supports frequency bands ranging from, e.g., 600 MHz to 100 GHz. In some embodiments, access node 110 may deploy a wireless network that supports frequency bands ranging from 3 GHz to 100 GHz. In some embodiments, access node 110 may deploy a wireless network that supports multiple frequency bands selected from 3 GHz to 100 GHz. In an exemplary embodiment, a macro-cell access node 110 may have a coverage area 115 in the range of approximately five kilometers to thirty-five kilometers and an output power in the tens of watts. In an embodiment, access node 110 may comprise two co-located cells, or antenna/transceiver combinations that are mounted on the same structure. In other embodiments, any other combination of access nodes and carriers deployed therefrom may be evident to those having ordinary skill in the art in light of this disclosure.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access nodes 110 are further described with reference to FIG. 2.

Wireless devices 130a, 130b, 140, 150, 160a and 160b may be any device, system, combination of devices, or other such communication platform capable of communicating wirelessly with access node 110 using one or more frequency bands and wireless carriers deployed therefrom. Each of wireless devices 130a, 130b, 140, 150, 160a, 160b may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices may be or include high power wireless devices or standard power wireless devices. Other types of communication platforms are possible.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals and carrying data, for example, to support voice, push-to-talk, broadcast video, and data communications by end-user wireless devices 130a, 130b, 140, 150, 160a, and 160b. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations, improvements, or variations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include S1 communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5GNR, and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a standalone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and may be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as types and duplexing methods of carriers deployed by access node 110, power classes and carrier aggregation capabilities of wireless devices 130a, 130b, 140, 150, 160a, and 160b associations therebetween. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
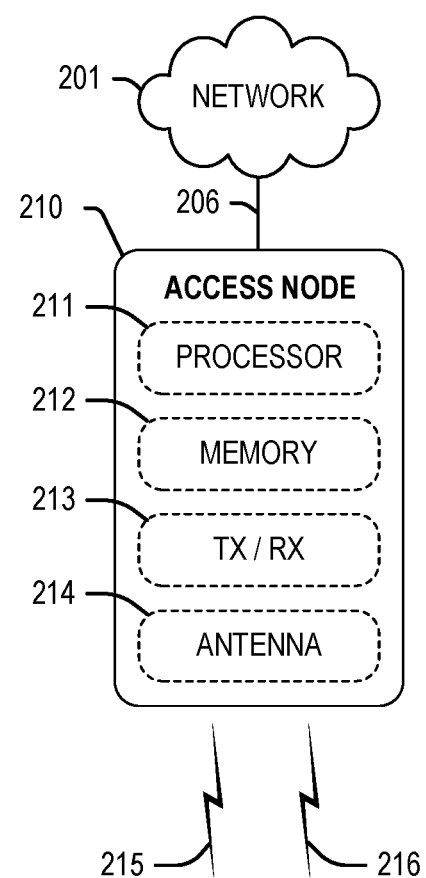
FIG. 2 depicts an exemplary access node, in accordance with the disclosed embodiments.

FIG. 2 depicts an exemplary access node 210. Access node 210 may comprise, for example, a macro-cell access node, such as access node 110 described with reference to FIG. 1. Access node 210 is illustrated as comprising a processor 211, memory 212, transceiver 213, and antenna 214. Processor 211 executes instructions stored on memory 212, while transceiver 213 and antenna 214 enable wireless communication with other network nodes, such as wireless devices and other nodes. For example, access node 210 may be configured to deploy at least two different carriers 215, 216. The carriers 215 and 216 may utilized different RATs. For example, a first carrier 215 utilizing a first RAT may be deployed by access node 210, and a second carrier 216 utilizing a second RAT may be deployed by access node 210. These features may be enabled by access node 210 comprising two co-located cells, or antenna/transceiver combinations that are mounted on the same structure. Network 201 may be similar to network 101 discussed above. Carrier aggregation mode, during which a wireless device utilizes more than one carrier, enables the wireless devices to communicate with access node 210 using a combination of resources from both carriers 215 and 216.

Figure 4:
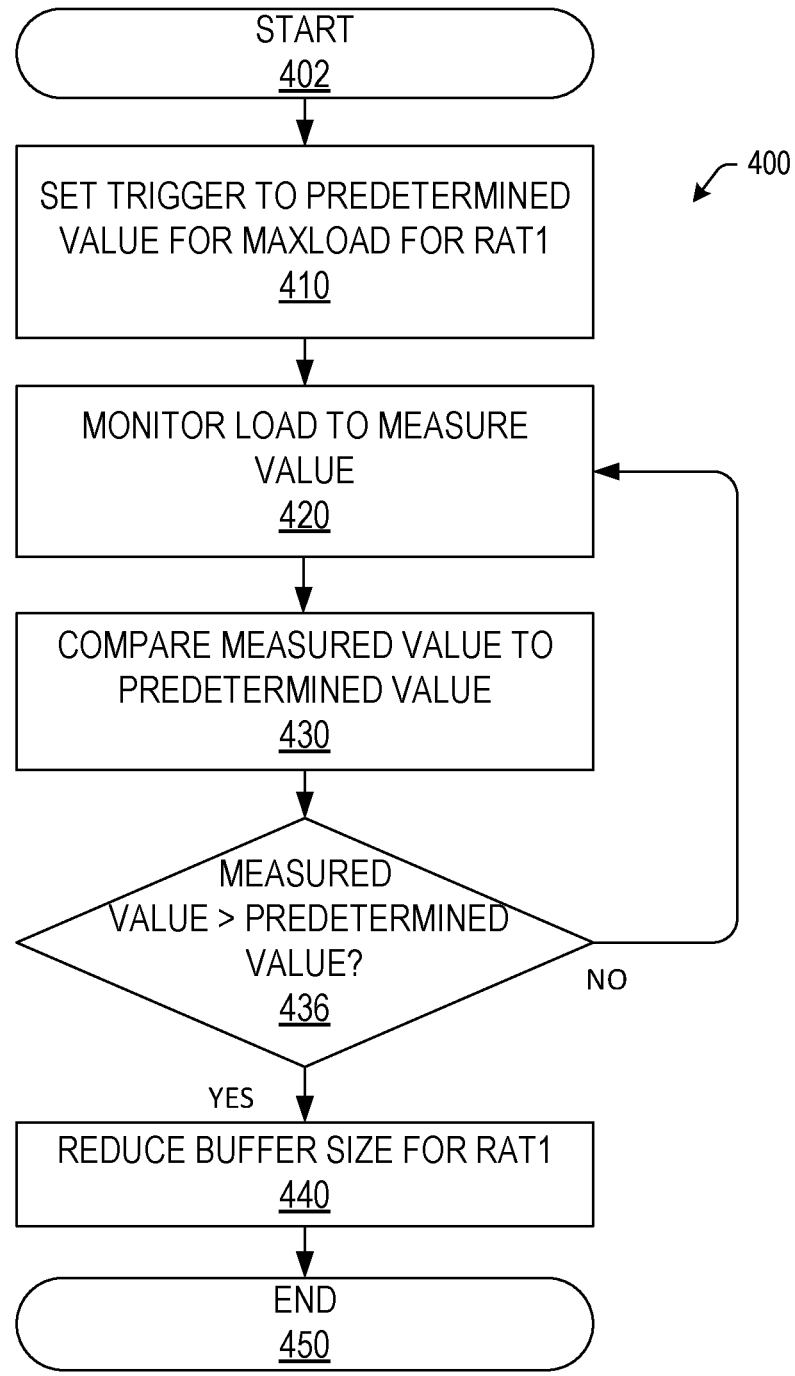
FIG. 4 depicts an exemplary method for dynamically modifying a buffer size, in accordance with the disclosed embodiments.

Further, instructions stored on memory 212 can include instructions for buffer modification, as will be further explained below with reference to FIGS. 4-6. The instructions may facilitate determining a load on a first RAT. For example, a number of wireless devices using the first RAT can be determined or a percentage of PRB usage for wireless devices deploying the first RAT can be determined. The instructions further may allow comparison of the measured load to a predetermined value. In embodiments, the comparison results in dynamic reduction of a buffer size for the first RAT. Upon reduction of the buffer size, wireless devices using the first RAT may also begin to utilize carriers employing the second RAT in order to balance the network load. Further, the access node 210 may similarly determine a load on the resources using the second RAT and utilize buffer modification to initiate CA only when the load on the second RAT is sufficiently low. Additionally, in embodiments, during low loading conditions on the first RAT, the access node may increase the size of the buffer associated with the first RAT to enable higher usage and balance the network load.

Figure 3:
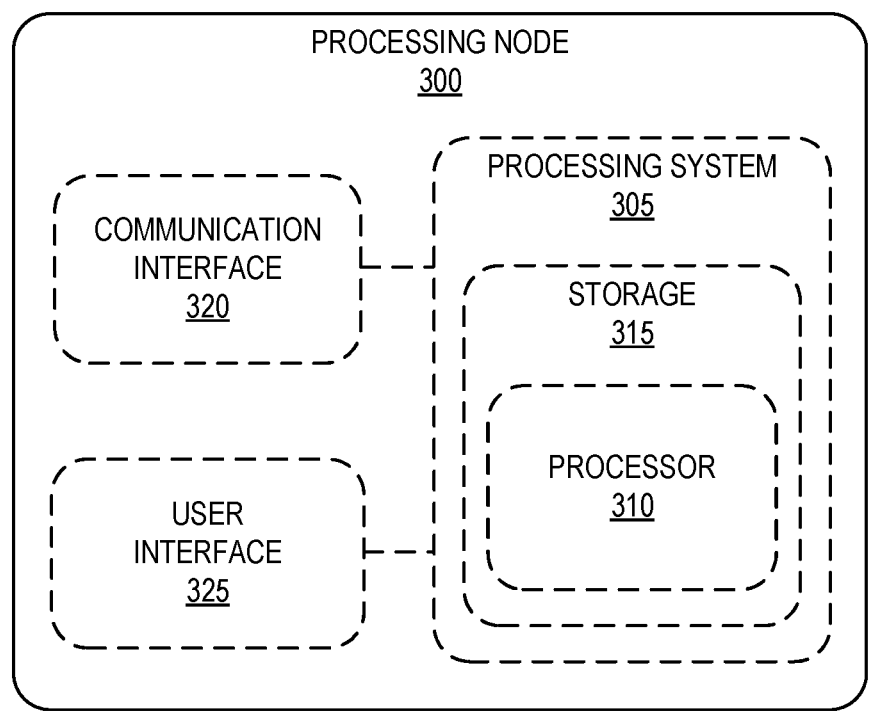
FIG. 3 depicts a processing node for facilitating buffer size modification, in accordance with the disclosed embodiments

FIG. 3 depicts an exemplary processing node 300, which may be configured to perform the methods and operations disclosed herein for dynamic buffer modification. In some embodiments, processing node 300 may be included in an access node, such as access node 110 or 210. In further embodiments, processing node 300 may be included in controller node 104 and may be configured for controlling the access nodes.

Processing node 300 may be configured for performing dynamic buffer modification for one or more buffers in a network. The buffer modification may be performed dynamically in real time based on a load on resources utilizing particular RAT technologies in a network, such as the network 101. Processing node 300 may include a processing system 305. Processing system 305 may include a processor 310 and a storage device 315. Storage device 315 may include a disk drive, a flash drive, a memory, or other storage device configured to store data and/or computer readable instructions or codes (e.g., software). The computer executable instructions or codes maybe accessed and executed by processor 310 to perform various methods disclosed herein. Software stored in storage device 315 may include computer programs, firmware, or other form of machine-readable instructions, including an operating system, utilities, drivers, network interfaces, applications, or other type of software. For example, software stored in storage device 315 may include a module for performing various operations described herein. Processor 310 may be a microprocessor and may include hardware circuitry and/or embedded codes configured to retrieve and execute software stored in storage device 315.

Processing node 300 may include a communication interface 320 and a user interface 325. Communication interface 320 may be configured to enable the processing system 305 to communicate with other components, nodes, or devices in the wireless network. Communication interface 320 may include hardware components, such as network communication ports, devices, routers, wires, antenna, transceivers, etc. User interface 325 may be configured to allow a user to provide input to processing node 300 and receive data or information from processing node 300. User interface 325 may include hardware components, such as touch screens, buttons, displays, speakers, etc. Processing node 300 may further include other components such as a power management unit, a control interface unit, etc.

The disclosed methods for dynamic buffer modification are discussed further below. FIG. 4 illustrates an exemplary method 400 for dynamic buffer modification in a network utilizing at least two RATs. Method 400 may be performed by any suitable processor discussed herein, for example, a processor included in access node 110 or 210, processor 310 included in processing node 300, or a processor included in controller node 104. For discussion purposes, as an example, method 400 is described as being performed by a processor included in access node 110.

Method 400 starts in step 402 and may include setting a trigger to a predetermined value maximum load on resources utilizing a first RAT in step 410. In disclosed embodiments, the first RAT may be NR and the network may comprise an ENDC architecture. The predetermined value may be selected to facilitate balanced distribution of traffic in the network. For example, access node 110 may determine a maximum number of wireless devices in the coverage area of the access node 110 utilizing the first RAT. In additional embodiments, the access node may set the maximum load as corresponding to a percentage of PRB utilization for the wireless devices utilizing the first RAT. The maximum be set, for example, based on network characteristics and capabilities.

In step 420, the access node 110 may determine the load on resources associated with the first RAT in real time or at a predetermined time interval (e.g., every 1 minute, 2 minutes, 5 minutes, etc.). In some embodiments, the load determination may be performed in real time as the wireless device may constantly transmit resource block usage information to access node 110. In some embodiments, the load determination may be performed at every predetermined time interval. The monitoring process outputs a measured value of a load on the first RAT. The measured value may be or include a number of connected devices, a percentage of PRB utilization, or another measure indicative of network load on the resources associated with the first RAT.

Method 400 may include comparing in step 430, the measured value from step 420 with the predetermined value set in step 410. For example, access node 110 may determine whether the number of wireless devices connected to the resources associated with the first RAT exceeds the predetermined maximum number of wireless devices. In embodiments, the access node 110 determines whether the measured value of PRB utilization exceeds the predetermined maximum set in step 410.

If, based on the comparison performed by the access node 110 in step 436, the access node determines that the measured value of step 420 does not exceed the predetermined value, the access node 110 returns to step 420 to monitor load. If, however, the access node determines that the measured value of step 420 exceeds the predetermined maximum value set in step 410, the access node reduces a buffer size of a buffer associated with the first RAT in step 440 and the method ends in step 450. An effect of the reduction in buffer size associated with the first RAT is to trigger carrier aggregation and cause one or more wireless devices to utilize the first RAT as a PCell, but to leverage an SCell using a second RAT in order to create a more balanced load. In some embodiments, the second RAT may be LTE and one or more wireless devices may utilize the NR carrier as the Pcell and the LTE carrier as the Scell. Although the method is shown as ending in step 450, it should be understood that the method can be performed continuously in order maintain throughput and balanced distribution of traffic.

Figure 5:
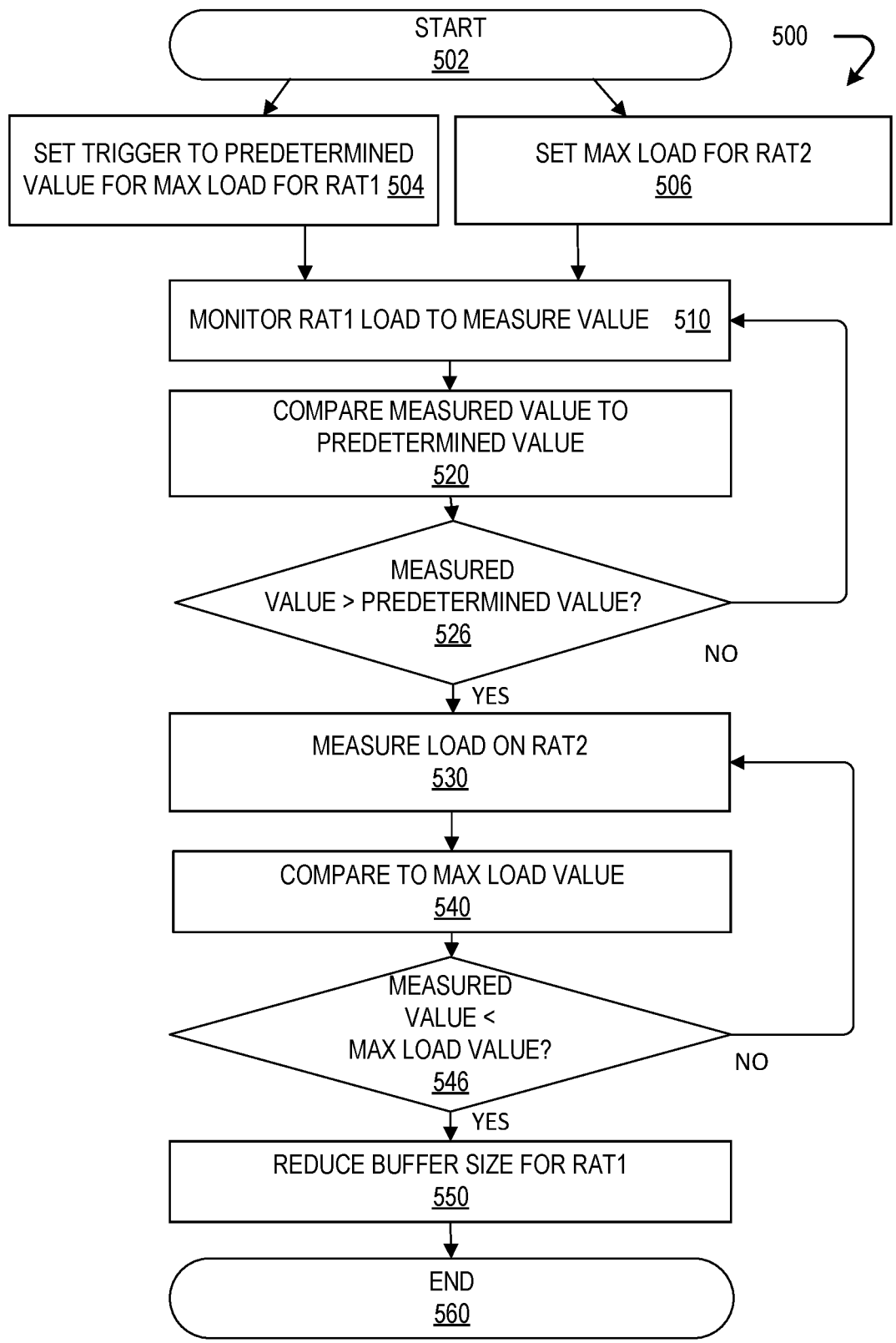
FIG. 5 depicts another exemplary method for dynamically modifying a buffer size based on multiple loads in accordance with the disclosed embodiments.

FIG. 5 depicts another exemplary method 500 for dynamically modifying a buffer size based on multiple loads in accordance with the disclosed embodiments. Method 500 may be performed by any suitable processor discussed herein, for example, a processor included in access node 110 or 210, processor 310 included in processing node 300, or a processor included in controller node 104. For discussion purposes, as an example, method 500 is described as being performed by a processor included in access node 110. Compared with method 400, method 500 includes additional steps or operations. In method 500, the system monitors the network load on carriers using multiple RATs.

Method 500 may begin in steps 502. Step 504 includes setting a predetermined value of a maximum load for a first RAT and step 506 includes setting a maximum load value for a second RAT. In step 510, the access node 110 monitors the load value associated with the first RAT, which may, for example, be an NR RAT. As set forth above, monitoring may include measuring an actual load value by determining a number of wireless devices connected using the first RAT or by assessing a percentage of PRB usage of wireless devices connected using the first RAT, or by using an alternative measurement technique.

In step 520, the access node 110 compares the measured value from step 510 to the predetermined value for the first RAT from step 504. If the measured value is greater than the predetermined value in step 526, the method proceeds to step 530 to measure the load on the second RAT. However, if the measured value is not greater than the predetermined value in step 526, then the method returns to step 510 to continue monitoring the load on the first RAT.

If the measured load value was deemed greater than the predetermined value in step 526, the access node 110 measures the load on the resources associated with the second RAT in step 530. In embodiments disclosed herein, the second RAT may, for example, be an LTE RAT. The measurement may be performed, for example, by determining the number of wireless devices connected over the second RAT, by determining PRB percentage utilization by wireless devices connected over the second RAT, or by another alternative technique.

In step 540, the access node 110 compares the measurement of the load on the second RAT from step 530 with the max load value for the second RAT set in step 506. If, in step 546, the measured value from step 530 is less than the max load value set in step 506, the method proceeds to step 550 and reduces the buffer size for the first RAT. The reduction of the buffer size for the first RAT may result in utilization of the second RAT as an SCell carrier for one or more wireless devices utilizing the first RAT. If the measured value is not less than the max load value in step 546, the monitoring continues in step 530. The method ends in step 560. Although the method is shown as ending, it should be understood that the steps of the method could be performed continuously in order to ensure maximum throughput and network utilization.

Figure 6:
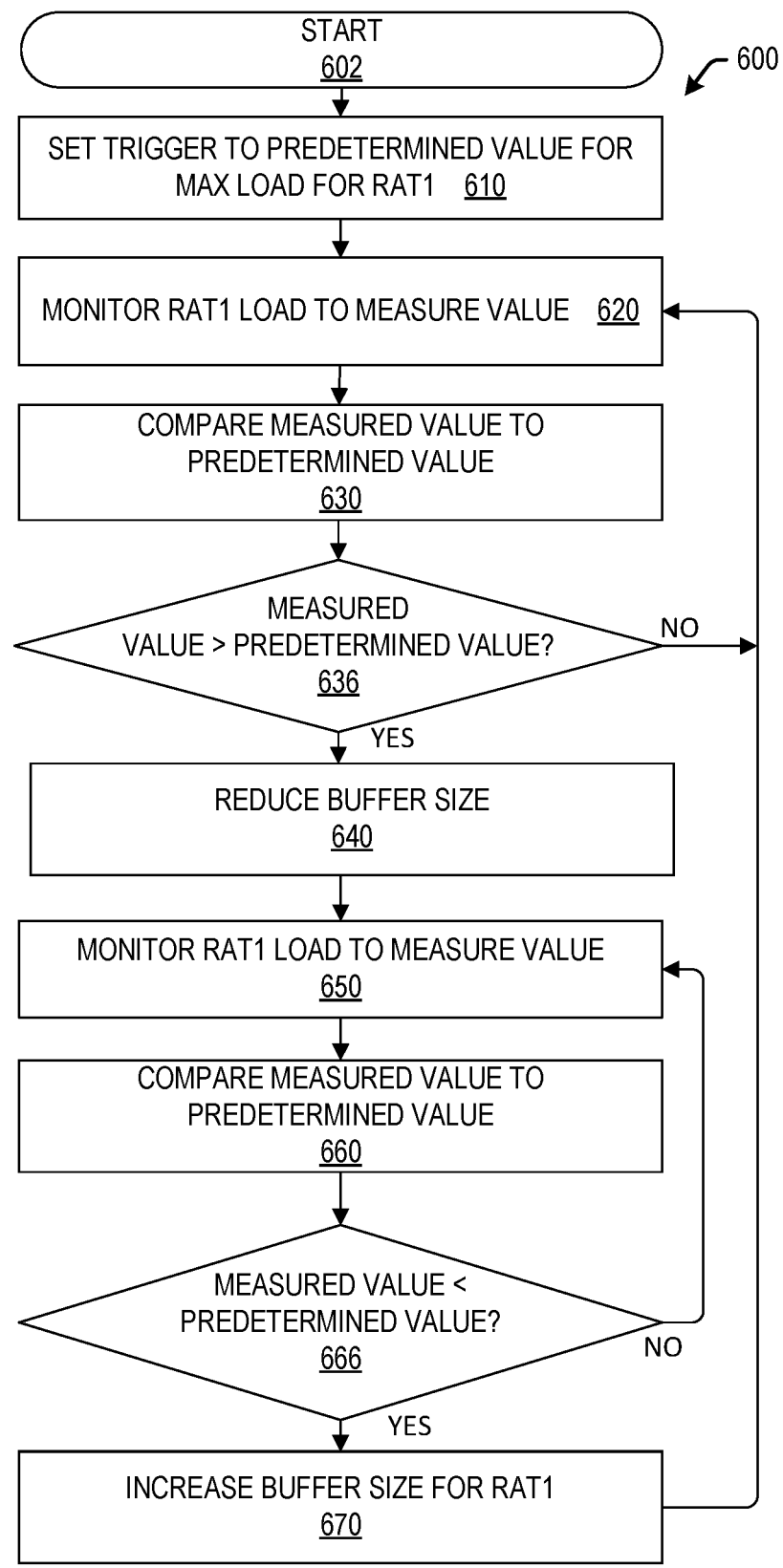
FIG. 6 depicts an additional exemplary method for dynamically modifying a buffer size in response to changing network loads, in accordance with the disclosed embodiments.

FIG. 6 depicts an additional exemplary method 600 for dynamically modifying a buffer size in response to changing network loads, in accordance with the disclosed embodiments. Method 600 may be performed by any suitable processor discussed herein, for example, a processor included in access node 110 or 210, processor 310 included in processing node 300, or a processor included in controller node 104. For discussion purposes, as an example, method 600 is described as being performed by a processor included in access node 110. Compared with methods 400 and 500, method 600 includes additional steps or operations. In method 600, the system monitors the network load on resources utilizing the first RAT technology and continuously adjusts the buffer size for the first RAT based on both increases and decreases in a measured load on the first RAT. The method of FIG. 6 may also incorporate the functionality described in conjunction with FIG. 5 such that load on the second RAT is similarly monitored for increase load above a maximum value or decreased load below a maximum value.

The method 600 of FIG. 6 starts in step 602. In step 610, the access node 110 sets a trigger to a predetermined value for a maximum load on the first RAT. In step 620, the access node 110 measures the actual load on the first RAT. As set forth above, measurement can occur continuously in real time or can occur at regular time intervals. Measurement of the load may be performed in multiple alternative ways, including for example, measurement of the number of wireless devices connected to the network using the first RAT, measurement of percentage PRB usage by the wireless devices connected to the network using the first RAT, or other method for measuring load. In step 630, the access node 110 compares the measured value of step 630 to the predetermined value set as the trigger in step 610. If the measured value exceeds the predetermined value in step 636, the access node 110 reduces the buffer size for the first RAT in step 640. The reduction in buffer size may be performed in accordance with a predetermined formula created to ensure that one or more wireless devices will utilize a second RAT as an SCell carrier responsive to the buffer size reduction of the first RAT.

The method 600 further includes continuing to monitor to the load on the resources of the first RAT in step 650 and continuing to compare the measured value of step 650 with the predetermined value of step 610 in step 660. Thus, if the measured value drops a predetermined percentage below the predetermined value in step 666, the access node 110 may be configured to increase the buffer size associated with the first RAT in step 670 to enable the wireless devices to maximize usage of the first RAT. If the measured value has not dropped to the set amount or percentage below the predetermined value in step 666, the access node continues to monitor the load on the first RAT in step 650 to determine if usage of the first RAT drops sufficiently to trigger a buffer size increase.

If the access node 110 increases the buffer size associated with the first RAT in step 670, the method continues to monitor the load on the first RAT for an increase above the predetermined value in step 620 so that the buffer size associated with the first RAT may again be decreased if the load on the first RAT increases above the predetermined value.

Although not shown, steps of the method 500 may be incorporated into the method 600 so that both the load on the resources of the first RAT and load on the resources of the second RAT are continuously monitored in order to allow for dynamic modifications to buffer size to trigger optimal utilization of the network.

In some embodiments, methods 400, 500, and 600 may include additional steps or operations. All displayed methods may, for example dynamically modify the sizes of both the buffers associated with the first and second RATs. Furthermore, the methods may include steps shown in each of the other methods. Further, the methods may determine buffer sizes for optimal network usage so that wireless carriers receive full benefit of available network resources and throughput will be improved for end users. As one of ordinary skill in the art would understand, the methods 400, 500, and 600 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion.

The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for dynamically modifying a buffer in a network deploying multiple carriers, each carrier utilizing a radio access technology (RAT), the method comprising:
    setting a trigger to a predetermined value for a network load for carriers utilizing a first RAT in the network;
    monitoring the network to determine a measured value of the network load for carriers utilizing the first RAT;
    performing a comparison to determine that the measured value exceeds the predetermined value;
    activating the trigger upon detection that the measured value exceeds the predetermined value;
    reducing a size of the buffer in response to activation of the trigger; and
    in response to reducing the size of the buffer, triggering use of a carrier utilizing a second RAT to initiate carrier aggregation for at least one wireless device communicating in the network.

2. The method of claim 1, wherein the buffer corresponds to a primary cell (Pcell) during carrier aggregation.

3. The method of claim 2, wherein the first RAT is new radio (NR) and the second RAT is long term evolution (LTE).

4. The method of claim 2, wherein the buffer corresponding to the PCell is a new radio (NR) buffer.

5. The method of claim 1, wherein monitoring the network comprises monitoring physical resource block (PRB) utilization within the network to determine load and the predetermined value corresponds to a percentage of PRB utilization.

6. The method of claim 1, wherein monitoring the network comprises determining a number of wireless devices connected using the first RAT and the predetermined value corresponds to a predetermined number of wireless devices.

7. The method of claim 1, further comprising pre-setting a reduction amount for reducing the size of the buffer based on the predetermined value.

8. The method of claim 1, further comprising dynamically selecting a reduction amount for reducing the size of the buffer based on the measured value.

9. The method of claim 1, further comprising measuring a second network load for the carriers using a second RAT, comparing the second network load to a max load value and activating the trigger and dynamically modifying the size of the buffer only in response to the second network load being less than the max load value.

10. A method for dynamically modifying a buffer in a network deploying multiple carriers, each carrier utilizing a radio access technology (RAT), the method comprising:
    setting a trigger to a predetermined value for a network load for carriers utilizing a first RAT in the network;
    monitoring the network to determine a measured value of the network load for carriers utilizing the first RAT;
    performing a comparison to determine that the measured value exceeds the predetermined value;
    activating the trigger upon detection that the measured value exceeds the predetermined value; and
    monitoring the network to detect a reduction in the network load on carriers using the first RAT below the predetermined value and increasing the size of the buffer, thereby terminating carrier aggregation for at least one wireless device.

11. A system for dynamically modifying a buffer in a network deploying multiple carriers, each carrier utilizing a radio access technology (RAT), the system comprising:
    a network load monitoring processor that measures a network load on carriers using a first RAT to produce a measured value; and
    a buffer management processor that receives the measured value, performs a comparison of the measured value with a predetermined value, dynamically reduces a size of the buffer in response to the measured value exceeding the predetermined value, and in response to the reduction in the size of the buffer, triggers use of a carrier utilizing a second RAT to initiate carrier aggregation for at least one wireless device communicating in the network.

12. The system of claim 11, wherein the buffer corresponds to a primary cell (Pcell) during carrier aggregation.

13. The system of claim 12, wherein the first RAT is new radio (NR) and the second RAT is long term evolution (LTE).

14. The system of claim 11, wherein the network load monitoring processor determines a number of wireless devices connected using the first RAT and the predetermined value corresponds to a predetermined number of wireless devices.

15. The system of claim 11, wherein the network load monitoring processor monitors physical resource block (PRB) utilization within the network to determine load and the predetermined value corresponds to a percentage of PRB utilization.

16. The system of claim 11, wherein the network load monitoring processor measures a second network load for carriers using a second RAT and the buffer management processor compares the second network load to a max load value and dynamically modifies the size of the buffer only in response to the second network load being less than the max load value.

17. The system of claim 11, wherein the buffer management processor pre-sets a reduction amount for reducing the size of the buffer based on the predetermined value.

18. The system of claim 11, wherein the buffer management processor dynamically selects a reduction amount for reducing the size of the buffer based on the measured value.

19. The system of claim 11, wherein the network monitoring processor measures a second network load for the carriers using a second RAT, the buffer management processor comparing the second network load to a max load value and activating the trigger and dynamically reducing the size of the buffer only in response to the second network load being less than the max load value.

* * * * *